United States Patent [19]

Gifford et al.

[11] Patent Number: 4,463,072
[45] Date of Patent: Jul. 31, 1984

[54] SECONDARY BATTERIES CONTAINING ROOM-TEMPERATURE MOLTEN 1,2,3-TRIALKYLIMIDAZOLIUM HALIDE NON-AQUEOUS ELECTROLYTE

[75] Inventors: Paul R. Gifford, Union; James B. Palmisano, Roselle Park; Lawrence W. Shacklette, Maplewood; Ronald R. Chance, Morris Plains; James E. Toth, Maplewood, all of N.J.

[73] Assignee: Allied Corporation, Morris Township, Morris County, N.J.

[21] Appl. No.: 556,497

[22] Filed: Nov. 30, 1983

[51] Int. Cl.³ .............................................. H01M 6/14
[52] U.S. Cl. .................................. 429/194; 429/198; 429/199; 429/213
[58] Field of Search ................ 429/194, 198, 199, 213

[56] References Cited

U.S. PATENT DOCUMENTS

| | | | |
|---|---|---|---|
| 2,446,331 | 8/1948 | Hurley | 204/39 |
| 2,446,349 | 8/1948 | Wier et al. | 204/39 X |
| 2,446,350 | 8/1948 | Wier | 204/39 |
| 4,122,245 | 10/1978 | Nardi et al. | 429/194 |
| 4,321,114 | 3/1982 | MacDiarmid et al. | 429/213 X |
| 4,355,086 | 10/1982 | Sasthoff et al. | 429/199 X |

OTHER PUBLICATIONS

Inorg. Chem., 1982, 21, 1263–1264, Wilkes et al.
J. Electrochem. Soc., (1983), 130, (No. 9), pp. 1965–1969, Osteryoung et al.
J. Electrochem. Soc., 130, 1107, (1983), Yen et al.

*Primary Examiner*—Charles F. Lefevour
*Attorney, Agent, or Firm*—Alan M. Doernberg; Gerhard H. Fuchs; Thomas D. Hoffman

[57] ABSTRACT

Batteries and especially secondary batteries employing an anode comprising aluminum and a molten, non-aqueous electrolyte containing admixtures of aluminum halide and 1,2,3-trialkylimidazolium halides having the formula TimX:

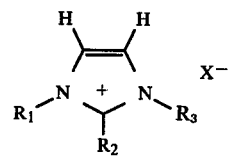

wherein $R_1$, $R_2$ and $R_3$ are independently alkyl groups of 1 to 12 carbons and X is independently halide or mixtures of halides, e.g., chloride and/or bromide are disclosed. The molar ratio of aluminum hereinafter denoted by Al, to trialkylimidalozium, hereinafter denoted by Tim, in the electrolyte, may be varied over a wide range so as to make the molten electrolyte composition acidic and as such the electrolyte is useful in batteries, especially secondary batteries employing aluminum anodes and a variety of cathodes.

26 Claims, No Drawings

SECONDARY BATTERIES CONTAINING ROOM-TEMPERATURE MOLTEN 1,2,3-TRIALKYLIMIDAZOLIUM HALIDE NON-AQUEOUS ELECTROLYTE

BACKGROUND OF THE INVENTION

This invention relates to batteries and especially secondary batteries employing an anode comprising aluminum and a molten, non-aqueous electrolyte containing admixtures of aluminum halide and 1,2,3-trialkylimidazolium halides having the formula TimX:

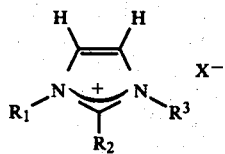

wherein $R_1$, $R_2$ and $R_3$ are independently alkyl groups of 1 to 12 carbons and X is independently halide or mixtures of halides, e.g., chloride and/or bromide. The molar ratio of aluminum hereinafter denoted by Al, to trialkylimidalozium, hereinafter denoted by Tim, in the electrolyte, may be varied over a wide range so as to make the molten electrolyte composition acidic and as such the electrolyte is useful in batteries, especially secondary batteries employing aluminum anodes and a variety of cathodes.

The use of mixtures of 2 moles of anhydrous aluminum halide such as $AlCl_3$ and 1 mole of a N-alkyl-pyridinium bromide or chloride as liquid electrolyte for electrodeposition of aluminum on a metal cathode such as iron at about room temperature is disclosed in U.S. Pat. Nos. 2,446,349 and 2,446,350. Also See U.S. Pat. No. 2,446,331. U.S. Pat. No. 4,115,390 (J. Nardi) and U.S. Pat. No. 4,122,245 (J. Nardi, et al.) describe the preparation of 1-alkylpyridinium chloride salts and the use of these salts for the preparation of 2:1 (mole/mole) $AlCl_3$:1-alkylpyridinium chloride room-temperature molten salt electrolytes. U.S. Pat. No. 4,122,245 discloses that the 1-alkylpyridinium molten salts are useful as low temperature battery electrolytes and describes a test cell employing aluminum or glassy carbon as the anode and chloranil as the cathode.

U.S. Pat. No. 4,355,086 (Saathoff et al.) discloses that the discharge rate and internal conductivity of a lithium thionyl chloride battery is improved by the addition of a mixture of aluminum chloride and n-butylpyridinium chloride to the cell electrolyte.

The preparation and use of 1,3-dialkylimidazolium chloride salts with aluminum chloride for room-temperature molten salt electrolytes in a battery cell having an aluminum anode and an iron(III)chloride cathode is described by J. S. Wilkes, et al., in the Frank J. Seiler Research Laboratory Technical Report FJSRL-TR-81-0011; ADA 107,989, October, 1981 and Inorg. Chem., 1982, 21, 1263-1264. Wilkes et al. assert that the 1,3-dialkylimidazolium chloroaluminate melts provide an increased liquidus composition range and improved stability to electrochemical reduction compared to the 1-alkylpyridinium chloride-based melts.

R. A. Osteryoung and co-workers at SUNY at Buffalo (J. Electrochem. Soc. (1983), 130 (No. 9) at pages 1965-1967 and 1968-1969) suggest that neutral room-temperature molten salts such as alkylpyridinium chloride or 1,3-dialkylimidazolium chloride-aluminum chloride might be useful for studies of polymer electrodes.

A variety of different batteries, and especially secondary non-aqueous batteries, have been described containing at least one electrode in which the active material is a conjugated polymer such as polyacetylene or polyphenylene. Exemplary disclosures of such batteries are U.S. Pat. No. 4,321,114 to MacDiarmid et al. (1981); European Patent Application No. 36,118 (corresponding to U.S. Ser. No. 220,496); European Patent Application Nos. 58,469 and 76,119, both of Showa Denko K.K.

There is an on-going search for batteries, especially secondary batteries employing useful working electrodes and a room-temperature, molten non-aqueous ionic liquid electrolyte having various physical and chemical properties superior to those of previously reported molten ionic liquid electrolytes, and especially having superior stability to electrochemical oxidation and reduction over a wider liquid composition range.

SUMMARY OF THE INVENTION

It has been discovered that batteries, and especially secondary batteries containing an aluminum anode, and a variety of cathodes may be constructed when the electrolyte used is molten, non-aqueous admixtures of aluminum halide, $AlX_3$, e.g., $AlCl_3$ or $AlBr_3$, and a 1,2,3,-trialkylimidazolium halide wherein the molar ratio, in the admixture of aluminum (Al) to 1,2,3,-trialkylimidazolium (Tim) is greater than about 1:1. Depending on the particular cathode material used, the electrolyte composition may also contain an alkali metal (especially $Li^+$) and/or tetraalkylammonium salt.

Accordingly, the present invention provides a battery containing an anode, a cathode, and a molten, non-aqueous electrolyte wherein:

(a) the anode comprises aluminum;

(b) the molten non-aqueous electrolyte comprises an admixture of aluminum halide having the formula $AlX_3$ and 1,2,3,-trialkylimidazolium halide having the formula TimX:

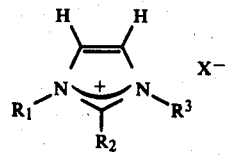

said admixture being disposed between said anode and cathode and in contact with each; wherein the molar ratio of Al to Tim is greater than about 1:1 and wherein $R_1$, $R_2$ and $R_3$ are independently alkyl of 1 to 12 carbons and wherein the halide X is independently halide or mixtures of halides.

In a preferred embodiment of the present invention, there is provided a battery containing an anode, a cathode, and a molten, non-aqueous electrolyte wherein:

(a) the anode comprises aluminum;

(b) the cathode comprises a member selected from the group consisting of graphite, iron sulfides on a carbon support, intercalation compounds of graphite, transition-metal chalcogenides, transition-metal halides, transition-metal oxyhalides and conjugated backbone polymers; and (c) a molten, non-aqueous electrolyte comprises an admixture of aluminum halide, $AlX_3$, and 1,2,3- trialkylimidazolium halide having the formula TimX:

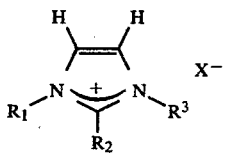

wherein the molar ratio of Al to Tim is in the range of about 1.5:1 to about 2.5:1 and wherein $R_1$, $R_2$ and $R_3$ are independently alkyl of 1 to 12 carbons and wherein X is independently halide or mixtures of halides.

DETAILED DESCRIPTION OF THE INVENTION

The non-aqueous electrolyte compositions used in the present invention are prepared in accordance with the procedure of commonly-assigned invention to Gifford and Palmisano (Ser. No. 556495) which is hereby incorporated by reference by slow addition of more than a stoichiometric amount of aluminum halide, e.g., $AlCl_3$ or $AlBr_3$, to a known weight of 1,2,3,-trialkylimidazolium halide having the formula TimX:

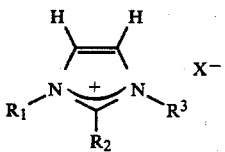

wherein $R_1$, $R_2$ and $R_3$ are independently alkyl of 1 to 12 carbons and wherein X is halide such as fluoride, chloride, bromide or iodide or mixtures thereof but preferably chloride, iodide or bromide and more preferably chloride or bromide. The molar ratio of Al to Tim in the electrolyte composition may be varied over a wide range from greater than about 1:1 and preferably from about 1.5:1 to about 2.5:1 but more preferably from about 1.5:1 to about 2.0:1.

While water may be present during the preparation of electrolyte compositions useful in the present invention, water deleteriously affects the use of the electrolyte compositions in batteries and as such must be removed prior to use.

In addition to the admixture of aluminum halide and trialkylimidazolium halide of formula TimX, the electrolyte composition useful in the present invention may also contain an electrochemically-inert organic liquid and/or an alkali metal salt, such as $Li^+$, $Na^+$, or $K^+$, especially $Li^+$, and/or tetraalkylammonium salt such as $Me_4N^+$, $Et_4N^+$ or $n-Bu_4N^+$, hereinafter defined.

The organic liquids which may be included in the batteries of the present invention should be electrochemically-inert to oxidation and reduction during use while simultaneously affecting a reduction in the viscosity and an improvement in the conductivity and stability of the electrolyte compositions used in the present invention. Examples of such organic liquids include propylene carbonate, sulfolane, 3-methyl-2-oxazolidone, alkane sultones, e.g., propane sultone, butane sultone [the use of sultones in electrolyte compositions is the subject of a related, commonly-assigned U.S. patent application of M. Maxfield et al. (Ser. No. 556,717) and the use of sultones for coatings on polymer anodes is the subject of a related, commonly-assigned U.S. patent application of M. Maxfield et al. (Ser. No. 556,739), both of said U.S. patent applications being filed on an even date herewith], dimethyl sulfoxide (DMSO), dimethyl sulfite, tetrahydrofuran (THF), 2-methyltetrahydrofuran (2-MeTHF), dioxane or 1,2-dimethoxyethane, dimethoxymethane, glymes, alkanoyl nitriles, e.g., proprionitrile, butyronitrile, acetonitrile, aranoylnitirles, e.g. benzonitrile, dichloromethane, tetraethylsulfamide and aromatic hydrocarbons, e.g., toluene, benzene.

Mixtures of such available organic liquids may also be used such as sulfolane and acetonitrile. The organic liquid(s) chosen will, of course depend upon many factors such as the precise electrolyte composition used, the voltage range desired as well as the choice of cathode and other components of the battery used.

While the major components of such batteries include electrodes (anode comprising aluminum and cathode), the electrolyte composition comprising admixtures of aluminum halide and 1,2,3,-trialkylimidazolium halide wherein the molar ratio of Al:Tim is greater than about 1:1 (additionally containing a suitable electrochemically-inert organic liquid and/or an alkali metal and/or tetraalkylammonium salt) and conventional or unconventional housing, charging mechanism, (means for applying an electrical change so that the battery may operate as a secondary as well as a primary battery) current collector, porous divider (e.g., to divide the molten electrolyte into an anodic portion adjacent to the anode and a cathodic portion adjacent to the cathode) and the like, only the electrodes and electrolyte composition will be described.

As used herein "anode" shall mean the negative electrode, and "cathode" shall mean the positive electrode.

The batteries of the present invention always comprise aluminum as an anode. Such suitable aluminum anodes include aluminum rods, aluminum foil or aluminum which may be attached to (e.g., plated on) a suitable current collector such as for example nickel, tungsten, or carbon foil, expanded metal screen or fiberous mat.

While the anode comprises aluminum, the suitable cathodes comprise a member selected from the group consisting of graphite, iron sulfides on a carbon support, especially $FeS_2$, as illustrated in Example 7, intercalation compounds of graphite, transition metal chalcogenides, transition metal halides, transition metal oxyhalides, and oxidized (acceptor-doped) conjugated backbone polymers.

Suitable intercalation compounds of graphite are described by M. Armand and P. Touzain in *Mater. Sci. and Eng.*, Vol. 31, pages 319–329 (1977) which is hereby incorporated by reference. Such intercalation compounds include transition metal chlorides, bromides, and fluorides which are, e.g., $AlCl_3$, $AlBr_3$, $BF_3$, $TiF_4$, $CoCl_2$, $FeCl_3$, $FeBr_3$, $HgCl_2$, $SbCl_5$, $MoCl_5$, $WCl_6$, $NiCl_2$, $CrCl_3$.

The cathode materials useful in the present invention may be transition metal halides, such as for example $FeCl_3$, $FeBr_3$, $CrCl_3$ or $CrBr_3$ but also may be $CoBr_3$, $CoCl_3$, and may also be transition metal oxyhalides such as FeOCl, FeOBr, CrOCl, CrOBr, or CoOBr.

Where the cathode is a transition metal halide such as $FeCl_3$, an alkali metal salt (especially $Li^+$) and/or tetraalkylammonium salt can be added to the electrolyte composition. When the cathode is a transition metal oxyhalide such as FeOCl, such salts are preferably added to the electrolyte composition. The anion of such salts should be stable to reduction by the aluminium anode and to oxidation by the cathode material chosen for use in the battery of the present invention and is typically halide, e.g., $I^-$, $Cl^-$ or $Br^-$ e.g., $AlX_4^-$, e.g., $AlCl_4^-$, $AlBr_4^-$ or $AlCl_3Br^-$ but may also be, for example, $FeCl_4^-$, $ClO_4^-$, $BF_4^-$, $PF_6^-$, $AsF_6^-$, $SbF_6^-$, $BCl_4^-$, $PCl_6^-$, $PCl_4^-$, $SbCl_4^-$, $SbCl_6^-$, $MoCl_6^-$, $AsCl_6^-$ and the corresponding bromides or mixtures of halides, e.g., $FeBr_3Cl^-$.

The transition metal chalcogenides suitable as cathode materials useful in this invention and which can contain inserted alkali metals include the transition metal dichalcogenides such as $TiS_2$ and, among others, those listed on page 392 of "Lithium Batteries" edited by J. P. Gabano (Academic Press, 1983) and in K. M. Abraham, *Solid State Ionics*, vol. 7 pp. 199–212 (1982) (both incorporated herein by reference). These include (with approximate open circuit potentials measured in various organic electrolytes when fully charged or devoid of inserted cations):

| | |
|---|---|
| $Li_xNiPS_3$ | 1.8 V versus $Li/Li^+$ |
| $Li_xVSe_2$ | 2.0 V versus $Li/Li^+$ |
| $Na_xTiS_2$ | 2.1 V versus $Na/Na^+$ |
| $Na_xNbS_2Cl_2$ | 2.2 V versus $Na/Na^+$ |
| $Li_xFe_{0.25}V_{0.075}S_2$ | 2.4 V versus $Li/Li^+$ |
| $Li_xTiS_2$ | 2.5 V versus $Li/Li^+$ |
| $Li_xMoS_3$(amorphous) | 2.5 V versus $Li/Li^+$ |
| $Na_xCr_{0.5}V_{0.5}S_2$ | |
| $Na_xWO_{3-y}$ | 2.6 V versus $Na/Na^+$ |
| $Na_xMoS_3$(amorphous) | 2.7 V versus $Na/Na^+$ |
| $Na_xTaS_2$ | 2.7 V versus $Na/Na^+$ |
| $K_xWO_{3-y}$ | |
| $Li_xMoO_3$ | 2.8 V versus $Li/Li^+$ |
| $Li_xV_6O_{13}$ | 2.9 V versus $Li/Li^+$ |
| $Li_xCr_{0.5}V_{0.5}S_2$ | 2.9 V versus $Li/Li^+$ |
| $Li_xW_{0.2}V_{2.8}O_7$ | 3.0 V versus $Li/Li^+$ |
| $Na_xCoO_2$ | 3.3 V versus $Na/Na^+$ |
| $Li_xCr_3O_8$ | 3.6 V versus $Li/Li^+$ |
| $Li_xCoO_2$ | 4.7 V versus $Li/Li^+$ |

Alkali metal salts (especially $Li^+$, but also $Na^+$ and $K^+$) and/or tetraalkylammonium salts, e.g., $Me_4N^+$, $Et_4N^+$ or $n-Bu_4N^+$ can be incorporated into the molten electrolyte to be used with the transitions metal chalcogenides on the above list. The salt may contain any anion which is stable to oxidation by the cathode material chosen for use in the batteries of the present invention. The choice of anion will affect the amount of salt which can be incorporated into the molten electrolyte or melt. Especially preferred anions are those which allow the largest amount of salts to be incorporated without adversely affecting the viscosity or melting point of the melt. These preferred anions include halide, X, e.g., chloride, bromide or iodide or $AlX_4^-$, e.g., $AlCl_4^-$, $AlBr_4^-$ or $AlCl_3Br^-$, or $SbX_4^-$, e.g., $SbCl_4^-$. Other anions which may be used include, for example, $ClO_4^-$, $BF_4^-$, $PF_6^-$, $PCl_6^-$, $FeCl_4^-$, $PCl_4^-$, $AsF_6^-$, $SbF_6^-$, $SbCl_6^-$, $BCl_4^-$, $MoCl_6^-$ or $AsCl_6^-$ and corresponding bromides or mixed halides, e.g., $FeCl_3Br^-$. It should be understood that the addition of a particular Lewis Acid salt may be accomplished either by the addition of said Lewis Acid salt itself (e.g., $Li^+AlBr_4^-$, $Li^+FeCl_4^-$ or $Li^+SbCl_6^-$) or by addition of the corresponding alkali metal or tetraalkylammonium halide (a Lewis Base in these melts) plus a Lewis Acid, i.e., e.g., $LiBr+AlBr_3$, $LiCl+FeCl_3$ or $LiCl+SbCl_3$). The proportions of added Lewis Base and Lewis Acid need not always be equal, and in some instances only a Lewis Base (e.g., $Li^+Cl^-$ or $Me_4N^+Cl^-$) or Lewis Acid (e.g. $SbCl_5$) may be added. Lithium salts which are preferred include LiCl, LiBr, LiI, $Li^+AlCl_4^-$, $Li^+AlBr_4^-$, or mixtures formed by addition of LiCl or LiBr or LiI to, for example, $AlCl_3$ or $AlBr_3$.

The preferred concentration of said salt in the electrolyte will depend upon the temperature of operation and other factors. Preferably, however, the salt is at a concentration where the conductivity of the electrolyte is near a maximum and below a concentration where the molten electrolyte may solidify as a result of any environmental conditions to which the battery may be exposed.

Conjugated backbone polymers suitable as cathodes in the present invention are those polymers which are capable of being oxidized (acceptor-doped).

In their most heavily oxidized state such polymer cathode materials range in voltage from about 3.0 V to about 4.6 V vs $Li/Li^+$ (for measurements made in various typical organic electrolytes). In ascending order of approximate voltage vs $Li/Li^+$, examples of such polymers useful as cathode materials include oxidized polypyrrole (PP), polyacetylene (PA), polyaniline, polyazulene (PAZ), polythiophene (PT), poly(phenylene vinylene) (PPV), polyacenediyls (e.g. polynaphthalenediyl (PN)), polyacenes, poly(p-phenylene) (PPP), polythianthrene (PTA), poly(phenothiazine) (PPT), poly(phenylene sulfide) (PPS), and poly(phenylene oxide) (PPO).

Also included are substituted versions of the above, e.g., poly(3-methylthiophene) or copolymers of the above, and other polymers having conjugation along at least one backbone thereof and rendered conductive by electrochemical doping with either cations, anions, or both. The preferred polymers are polyacetylene and poly(p-phenylene).

The conjugated backbone polymers may be in the form of a powder or a free-standing film. The electrode may also contain additives to act as binders such as polypropylene, polytetrafluoroethylene (sold by DuPont as TEFLON ®) or poly(ethylene-chlorotrifluoroethylene (sold by Allied as HALAR ®), or to raise the conductivity such as carbon black (sold by Shawinigan Products as Shawinigan Black ®). The configuration of the polymer electrode may be of any desired type, including spirally wound, prismatic, or bipolar prismatic.

When either graphite or a conjugated backbone polymer is chosen as the cathode material, anions present in the molten, electrolyte compositions used in the present invention will be inserted into the cathode during the charging of the battery. In the acidic melt described herein, the anions inserted will likely be of the form $AlCl_3X^-$ or $Al_2Cl_6X^-$ wherein X is independently halide, preferably chloride or bromide. Additional salts, alkalimetal (e.g., $Li^+$, $Na^+$, and $K^+$) or tetraalkylammonium (e.g., $Me_4N^+$, $Et_4N^+$ and $n-Bu_4N^+$) may also be incorporated into the molten electrolyte composition when a conjugated backbone polymer or graphite is used as an electroactive cathode material. The anion of such salts is typically halide, e.g., $I^-$, $Cl^-$ or $Br^-$ or $AlX_4^-$, e.g., $AlCl_4^-$, $AlBr_4^-$ or $AlCl_3Br^-$ but may also be, for example, $ClO_4^-$, $BF_4^-$, $PF_6^-$, $SbF_6^-$, $BCl_4^-$, $PCl_4^-$, $SbCl_4^-$, $PCl_6^-$, $SbCl_6^-$, $FeCl_4^-$, $AsF_6^-$, $MoCl_6^-$ or $AsCl_6^-$ or corresponding bromides or mixed halides, e.g., $FeCl_3Br^-$.

EXAMPLE 1

A battery was assembled which contained an aluminum anode and a polyacetylene (PA) film cathode (weight 5 mg, dimension ca. 1 $cm^2 \times 0.013$ cm) with a platinum screen current collector. The battery which was sealed in a glass cell employed a non-woven glass separator and a molten electrolyte composed of a 1:2 mole mixture of 1,2-dimethyl-3-ethylimidazolium chloride and aluminum chloride prepared in accordance with the procedures of commonly-assigned invention of Gifford and Palmisano in U.S. patent application Ser. No. 556,495 filed Nov. 30, 1983 which is hereby incorporated by reference. The open-circuit voltage of this cell before charging was 0.75 V. The cell was charged at room temperature by increasing the applied voltage in 0.1 V steps until the amount of charge passed was equivalent to a 5% oxidation level of the polyacetylene cathode (i.e., until 0.05 electrons per CH unit were passed). The cell was then discharged in 0.1 V steps down from about 1.7 V to 0.8 V. With each successive cycle the coulombic efficiency improved in a manner which suggested a steady destruction or gettering of impurities. To facilitate this improvement process, the cell was held at a constant potential of 1.7 V until the charging current fell to a low value (20 $\mu$A). When the cell was subsequently cycled between the voltage limits of 1.7 V and 0.8 V the coulombic efficiency was found to have improved to ca. 98%. The capacity of the cell in this range was found to be equivalent to a 4.1% change in the oxidation level of the polyacetylene (0.084 Ah/g of PA). The cell was found to be capable of passing charge down to a potential of 0.6 V at which point the polyacetylene became resistive and the internal resistance of the cell abruptly increased. At this point the polyacetylene was presumed to be in the neutral (uncharged) state. In a final test to explore the possibility of higher oxidation levels, the cell was charged at 1.9 V and discharged to 0.6 V. The open-circuit voltage after charge was 1.81 V and the amount of charge passed on discharge to 0.6 V was equivalent to a change in oxidation level of 9.5% per CH unit (0.20 Ah/g of PA).

EXAMPLE 2

A battery was assembled with an anode of aluminum and a cathode composed of poly(p-phenylene), PPP, powder (26 mg) and Shawinigan© Black (3.1 mg) pressed onto a platinum current collector. The battery which was sealed in a glass cell employed a non-woven glass separator and an electrolyte composed of a 1:2 mixture of 1,2-dimethyl-3-ethylimidazolium chloride and aluminum chloride. The initial open-circuit voltage before charging was 1.08 V. The cell was charged at room temperature by increasing the applied potential in 0.1 V steps until the amount of charge passed was equivalent to a 15.2% oxidation per $C_5H_4$ unit (i.e., 0.152 electrons per $C_6H_4$). The cell was then discharged in 0.1 V steps down to 1.0 V. Over successive cycles the coulombic efficiency improved with each cycle reaching 87% on the fourth cycle. On the fifth cycle the cell was charged to 1.9 V and discharged down to 0.8 V. The polyphenylene cathode was found to be capable of supplying charge down to 0.9 V at which point it apparently reached its neutral state and became resistive. The charge taken out (discharge capacity) was equivalent to a change in oxidation of the poly(p-phenylene) of 18% per $C_6H_4$ unit (0.0635 Ah/g of PPP).

EXAMPLE 3

A cell containing the electrolyte, 2:1 (mole/mole) admixture of $AlCl_3$:1,2-dimethyl-3-ethylimidazolium chloride prepared in accordance with the procedure of Example 4 of the above-identified commonly-assigned invention of Gifford et al. in U.S. patent appl. Ser. No. 556,495 filed Nov. 30, 1983, a tungsten working electrode (Alfa Products) and an aluminum foil electrode (Alfa Products) was assembled. Al was successfully electrodeposited onto the W foil at a current density of 0.5 mA $cm^{-2}$ to give a granular, matte deposit. The asplated Al was successfully stripped and replated for 40 cycles at >90% coulombic efficiency. This Example demonstrates (1) that aluminum is plated onto a tungsten electrode using the electrolyte composition of the present invention and (2) that aluminum can be successfully electrochemically cycled and (3) that the electrolyte of the present invention would be useful in secondary battery applications using an aluminum negative electrode.

EXAMPLE 4

Al/Graphite Secondary Battery

A battery was constructed which consisted of a 6 mm diameter aluminum rod anode (Johnson Matthey Chemicals, Limited) and a 6.4 mm graphite rod (Alfa Products). The Al and graphite rods were introduced through the side ports of a 15 mL 3-necked pear-shaped flask (Kontes) containing approximately 8 mL of 2:1 (mole/mole) $AlCl_3$:1,2-dimethyl-3-ethylimidazolium chloride and extended approximately 1.5 cm into the electrolyte. The cell was constructed in an Ar-filled glove box (Vacuum Atmospheres Corp.) and all experiments were carried out in the glove box at or near 20° C.

This cell initially showed an open-circuit voltage of 1.7 V. The cell was repeatedly charged for 1 hour at 1 mA and discharged for 1 hour at 0.5 mA. A nearly constant voltage of 2.15 V was observed on charge. A gradually sloped cell voltage was observed on discharge, having an average voltage of 1.6 V.

Following 8 cycles described above, the cell was repeatedly charged for 2 hours at 1 mA and discharged for 2 hours at 1 mA. The cell again displayed a charging voltage of 2.1 V and gave an average discharge voltage of 1.3 V. After 6 such cycles the experiment was terminated.

EXAMPLE 5

Al/Fe(III)$Cl_3$ Secondary Battery

A battery was assembled consisting of an aluminum rod anode and a positive electrode consisting of the intercalation compound of 30–40% iron (III)chloride in graphite (Graphimet $FeCl_3$-35, Alfa Products) immersed in approximately 8 mL of 2:1 (mole/mole) $AlCl_3$:1,2-dimethyl-3-ethylimidazolium chloride, contained in a 15 mL 3-necked pear-shaped flask.

The $FeCl_3$-35 electrode was constructed by packing approximately 300 mg $FeCl_3$-35 powder into a glass tube terminating with a medium porosity glass frit of 0.425 inch diameter (Ace Glass). The glass frit serves to contain the powder and also as the battery separator. The powder is held packed in place with a carbon rod (Ultra Carbon Corp.) running down the inside of the glass tube containing the powder. This carbon rod also serves as the current collector and is held in place with epoxy at the end of the tube.

This cell initially displayed an open-circuit voltage of 1.8 V. The cell was initially charged at 200 μA for 3 hours and displayed a relatively flat voltage of 2.3 V. The cell was then repeatedly discharged at 100 μA for one hour and charged at 100 μA for 1 hour. On charge, the voltage rose to a plateau of 2.4 V. A gradually sloped discharge curve was observed with an average voltage of 1.7 V. The experiment was terminated after 25 cycles with no apparent loss in cell capacity.

EXAMPLE 6

Al/Mo(V)Cl$_5$

A battery was assembled consisting of an aluminum rod anode and a positive electrode consisting of 300 mg of the intercalation compound of 15% Mo(V)chloride in graphite (Graphimet MoCl$_5$-15). The positive electrode was constructed in an identical fashion to that described in Example 5.

The battery electrolyte consisted of the molten electrolyte prepared by mixing a total of 13.09 g AlCl$_3$, 7.0 g of 1,2-dimethyl-3-ethylimidazolium chloride and 0.47 g LiCl to give an overall composition of 2:0.88:0.22 AlCl$_3$:1,2-dimethyl-3-ethylimidazolium chloride:LiCl. This electrolyte was contained in a 25 mL 3-necked pear-shaped flask.

This cell was initially charged for 3 hours at 100 μA, then repeatedly discharged for 2 hours at 100 μA and charged for 2 hours at 100 μA. On charging, the cell gave a relatively flat voltage of 2.0 V. The discharge voltage was nearly flat at a value of 1.05 V. The experiment was terminated after 10 cycles with no apparent loss in cell capacity.

EXAMPLE 7

Al/FeS$_2$ Secondary Battery

A battery was assembled consisting of an aluminum rod and a FeS$_2$ cathode immersed into an electrolyte of 15 mL of 2:1 AlCl$_3$: 1,2-dimethyl-3-ethylimidazilium chloride.

A positive electrode consisting of FeS$_2$ powder (Alfa Products) was constructed as described below. The FeS$_2$ powder was affixed to reticulated vitreous carbon (RVC) (Energy Research and Generation, Inc) using the binder ethylene propylene diene terpolymer (EPDM) described by S. P. S. Yen et al., J. Electrochem. Soc., 130, 1107 (1983). A solution 1% by weight of EPDM in cyclohexane was prepared by dissolving 0.32 g EPDM in 4 mL of cyclohexane. A paste 3% by weight FeS$_2$ was made by adding 0.97 g FeS$_2$ powder to this solution. This was diluted with approximately 30 ml of cyclohexane to yield a liquid slurry.

This slurry was pulled through a 3.8 cm diameter disc of RVC, porosity grade 100, with mild vacuum from an aspirator. This disc was dried at 120° C. for 2 hours to remove the cyclohexane.

By comparing the pellet weight before and after addition of FeS$_2$, it was found that 600 mg FeS$_2$ were contained in the RVC. The disk was cut to the final electrode dimensions of approximately 1 cm by 3 cm. A tungsten wire (Alfa Products) was silver epoxied (Epoxy Technology, Inc) to the top of the electrode.

The cell consisted of a 3-necked 15 mL pear-shaped flask (Kontes) and contained approximately 8 mL of 2:1 AlCl$_3$:1,2-dimethyl-3-ethylimidazolium chloride. The FeS$_2$ electrode was half-submersed in the electrolyte and held in place by feeding the tungsten wire electrode connection through a rubber septum affixed over one side port of the flask. From the final electrode dimensions it was calculated that approximately 100 mg FeS$_2$ were contained in the immersed electrode.

The negative electrode consisted of a high-purity aluminum rod (Johnson Matthey Chemicals Ltd.) 6 mm in diameter and submersed approximately 1 cm into the electrolyte. The Al rod was introduced into the cell through the opposite side port using an Ace-thread adapter (Ace Glass).

The cell was operated at 20° C. and experiments were carried out under a dry argon atmosphere in a glovebox (Vacuum Atmospheres Co.).

The cell initially showed an open-circuit voltage of 1.6 V. The cell was initially charged at 100 μA for 2.5 hours, after which it was repetitively discharged and charged at 1 hour cycles at 100 μA.

The charging curve displayed two voltage regions; a sloped plateau at 1.5 V followed by a sloped rise to a second plateau at 1.85 V. On discharge, the cell voltage showed a gradual sloped line with an average voltage of 1.2 V.

Following 10 one hour cycles, the cell was alternately charged and discharged at 100 μA for 3 hour periods. The charging behavior was analogous to before, with the voltage plateau at 1.85 V becoming more pronounced. Two voltage regions were observed on discharge; a sloped region with average voltage of 0.95 V and a second, relatively flat region at 0.7 V. The experiment was terminated after 15 cycles of 3 hours charge/3 hours discharge.

We claim:

1. A battery containing an anode, a cathode, and a molten, non-aqueous electrolyte wherein:
   (a) the anode comprises aluminum;
   (b) the molten non-aqueous electrolyte comprises an admixture of aluminum halide having the formula AlX$_3$ and 1,2,3-trialkylimidazolium halide having the formula, TimX:

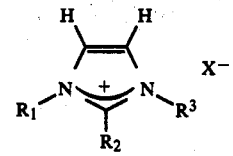

said admixture being disposed between said anode and cathode and in contact with each; wherein the molar ratio of Al to Tim is greater than about 1:1 and wherein R$_1$, R$_2$ and R$_3$ are independently alkyl of 1 to 12 carbons and wherein X is independently halide.

2. The battery of claim 1 wherein said electrolyte further comprises an electrochemically-inert organic liquid.

3. The battery of claim 1 wherein said cathode comprises a member selected from the group consisting of graphite, iron sulfides on a carbon support, intercalation compounds of graphite, transition metal chalcogenides, and compounds thereof and conjugated backbone polymers.

4. The electrolyte composition of claim 1 which further comprises an alkali metal salt and/or tetraalkylammonium salt.

5. The battery of claim 4 wherein said cathode comprises a conjugated backbone polymer selected from the group consisting of oxidized polypyrrole, polyacetylene, poly(3-methylthiophene), polythiophene, poly(-phenylene vinylene), polynaphthalenediyl, polythianthrene, poly(p-phenylene), and substituted versions thereof.

6. The battery of claim 5 wherein said conjugated backbone polymer is polyacetylene.

7. The battery of claim 5 wherein said conjugated backbone polymer is poly(p-phenylene).

8. The battery of claim 1 which further contains a porous divider thereby dividing said electrolyte into an anodic portion adjacent to the anode and a cathodic portion adjacent to the cathode.

9. The battery of claim 1 which further comprises means for applying an electrical charge whereby the battery can operate as a secondary battery.

10. The battery of claim 1 wherein $R_1$, $R_2$ and $R_3$ are linear alkyl groups of 1 to 5 carbons.

11. The battery of claim 1 wherein, $R_1$ and $R_2$ are methyl and $R_3$ is ethyl or n-propyl or n-butyl.

12. The battery of claim 11 wherein $R_3$ is ethyl.

13. The battery of claim 11 wherein $R_3$ is n-butyl.

14. The battery containing an anode, a cathode, a molten, non-aqueous electrolyte wherein:

(a) the anode comprises aluminum;

(b) the cathode comprises a member selected from the group consisting of graphite, iron sulfides on a carbon support, intercalation compounds of graphite, transition metal chalcogenides transition metal halides, transition metal oxyhalides and conjugated backbone polymers; and (c) the molten, non-aqueous electrolyte comprises an admixture of aluminum halide, $AlX_3$, and a 1,2,3-trialkylimidazolium halide having the formula, TimX:

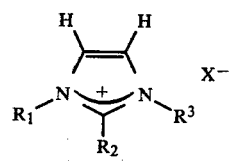

wherein the molar ratio of $AlX_3$ to Tim is in the range of about 1.5:1 to about 2.5:1 and wherein $R_1$, $R_2$ and $R_3$ are independently alkyl of 1 to 12 carbons and wherein X is independently halide.

15. The battery of claim 14 wherein the molten, non-aqueous electrolyte further comprises an electrochemically-inert organic liquid.

16. The electrolyte composition of claim 14 which further comprises an alkali metal salt and/or tetraalkylammonium salt.

17. The battery of claim 14 wherein the cathode comprises a polymer selected from the group consisting of oxidized polypyrrole, polyacetylene, poly(3-methylthiophene), polythiophene, poly(phenylene vinylene, polynaphthalenediyl, polythianthrene poly(p-phenylene) and substituted versions thereof.

18. The battery of claim 17 wherein said conjugated backbone polymer is polyacetylene.

19. The battery of claim 17 wherein said conjugated backbone polymer is poly(p-phenylene).

20. The battery of claim 14 wherein the transition metal chalcogenide is comprising the cathode is $Li_xCoO_2$ and wherein said molten electrolyte further comprises LiCl or LiBr.

21. The battery of claim 14 wherein $R_1$ to $R_3$ are linear alkyl groups.

22. The battery of claim 21 wherein $R_1$ and $R_2$ are methyl and $R_3$ is ethyl or n-propyl or n-butyl.

23. The battery of claim 22 wherein $R_3$ is ethyl.

24. The battery of claim 22 wherein $R_3$ is n-butyl.

25. The battery of claim 14 which further includes means for electrical charging whereby said battery can operate as a secondary battery.

26. The battery of claim 25 wherein the molar ratio of Al to Tim in said electrolyte is about 1.5:1 to 2.0:1.

* * * * *